United States Patent [19]

Righini et al.

[11] 4,222,628
[45] Sep. 16, 1980

[54] OPTICAL THIN FILM PROCESSOR FOR UNIDIMENSIONAL SIGNALS

[75] Inventors: Giancarlo Righini; Vera Russo; Stefano Sottini, all of Florence, Italy

[73] Assignee: Consiglio Nazionale Delle Ricerche, Rome, Italy

[21] Appl. No.: 930,062

[22] Filed: Aug. 1, 1978

[30] Foreign Application Priority Data

Aug. 1, 1977 [IT] Italy ................................ 9534 A/77

[51] Int. Cl.³ ................................................ G02B 5/14
[52] U.S. Cl. ............................ 350/96.11; 350/96.14; 350/96.19; 350/162 SF
[58] Field of Search ............... 350/96.11, 96.12, 96.13, 350/96.15, 96.18, 96.19, 162 SF

[56] References Cited

U.S. PATENT DOCUMENTS

| | | | |
|---|---|---|---|
| 3,917,384 | 11/1975 | Harper et al. | 350/96.18 |
| 4,153,330 | 5/1979 | Tomlinson | 350/96.18 |

OTHER PUBLICATIONS

G. C. Righini et al., "Thin Film Geodesic Lens," *Applied Optics*, vol. 11, No. 6, Jun. 1962, pp. 1442–1443.
G. C. Righini et al., "Geodesic Lenses for Integrated Optics," *1973 European Microwave Conf.*, vol. I, Belgium.
B. Chen et al., "Diffraction-Limited Geodesic Lens for Integrated Optics Circuits," Applied Phys. Lett., vol. 33, No. 6, 1978.

*Primary Examiner*—Stewart J. Levy
*Attorney, Agent, or Firm*—D. Paul Weaver

[57] ABSTRACT

An optical thin film processor for the elaboration of unidimensional signals embodies a dielectric thin film transparent to laser radiation, shaped as a spherical lune having an angle of 270°, supported by a spherical substrate, formed of material having a refractive index lower than that of the thin film, a point source located on either meridian delimiting the thin film, detecting means on the other meridian, a modulator located on a meridian at 90° relative to the input meridian, and a device lying on the meridian at 180° from the input meridian for the space-filtering of a signal coming from the modulator on the 90° meridian.

7 Claims, 2 Drawing Figures

OPTICAL THIN FILM PROCESSOR FOR UNIDIMENSIONAL SIGNALS

BACKGROUND OF THE INVENTION

The present invention relates to an optical thin film processor for the elaboration of unidimensional signals.

As is well known, considerable development has been taking place in recent years in the field of integrated optics. In this field, the main object of research, based on the possibility of obtaining the guided propagation of optical signals in very thin films, is the construction of miniaturized optical systems either with better performance with respect to optical and opto-electronic systems already in use, or with completely new functions.

With respect to traditional optical and opto-electronic systems, the integrated optical systems have the following advantages: smaller size and weight; a smaller feeding power; a greater band width; and a high reliability.

Particular interest has been devoted to the possibility of producing optical analogic processors, in integrated optics, which, in addition to the above-mentioned advantages, are likely to offer the security of a perfect alignment of components, and indifference to mechanical stresses. Such integrated processors may only operate with unidimensional signals, and may therefore be utilized in the field of radar signals and communications.

The signals to be processed are generally time-functions. They must, therefore, be converted into space-modulated light-signals. Their processing takes place by means of a filtering of the spatial frequencies.

Such processing devices include three elements, each of them performing a given function: a guiding system, which allows the guided propagation of the considered signals; an optical system including two or more lenses, to carry out the Fourier's transform of the optical signal; one or more signal modulation and detecting devices, to perform the conversion of the time-signal into a light-signal and vice versa and/or to carry out the filtering of the space-frequencies of the signal.

The basic components proposed for the known devices are currently being improved, and the difficulty met in producing thin-film lenses of a high quality represents a special problem.

Some methods, proposed to produce lenses for integrated optical circuits with plane substrate, are based on the variation of the effective refraction index of the thin layer acting as a wave guide. However, the lenses obtained by following this principle present some serious drawbacks, such as: significant spherical aberration, a reduced optical power, i.e. long focal distances, conversion effect of the propagation modes when passing through the edges of the lenses.

Moreover, their practical construction is complicated because of the need to adopt convenient masks, to deposit the material forming the lens, and of the high precision required.

The aim of the present invention is to produce a thin layer device for the processing of unidimensional signals, likely to eliminate the above-mentioned drawbacks, and to offer very favorable operational characteristics and simple construction.

Such an aim is attained, according to the invention, with an optical thin film device for the processing of unidimensional signals comprising:

(1) A thin film of dielectric material, transparent to the laser radiation, shaped as a spherical lune with an angle of 270°, supported by a spherical substrate, made of material with a refraction index lower than that of the thin film.

(2) A point source located on either meridian delimiting the thin film.

(3) Detecting means, located on the other meridian delimiting the thin film.

(4) A modulator located on the meridian laying at 90°, with respect to the input meridian.

(5) A device located on the meridian laying at 180° with respect to the input meridian, for the spatial filtering of the signal coming from the modulator located on the meridian laying at 90°.

Other features and advantages of the invention will become apparent during the course of the following description.

DETAILED DESCRIPTION

Figure 1:
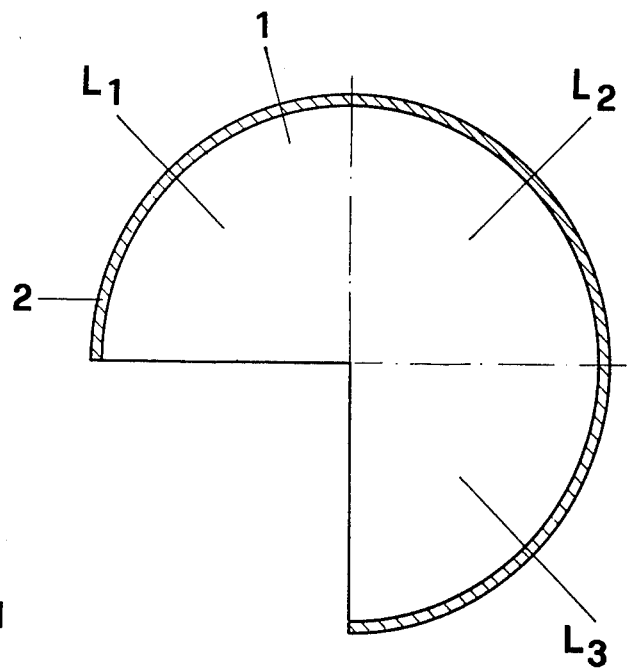
FIG. 1 is a cross section of the processor according to the invention, taken in the plane containing the optical axis of the system.

As used herein, the term "spherical lune" designates a solid, comprised of two concentric spherical surfaces, the greater radius of which is the sum of the minor radius of the interior spherical surface plus the thickness of the solid between the two concentric spherical surfaces.

Referring to the drawings in detail, the processor according to the invention comprises a substrate 1 shaped as a spherical segment, with an angle of 270°. It may be made of glass, of molten quartz or microcrystalline material, with a refraction index $n_1$, and may also be hollow. On its spherical surface, a thin film of dielectrical material is deposited, organic or not, transparent to the laser radiation, and having a refraction index $n_2 > n_1$. This film 2 has a thin thickness, with respect to the radius of curvature, and represents an optical wave guide.

Each spherical lune $L_1$, $L_2$, $L_3$ of the thin film 2, having an angle of 90°, behaves as a single lens. In fact, a parallel bundle, which perpendicularly intersects a maximum circle of the hollow sphere, is focalized in a point situated at a distance equal to one-fourth of maximum circle (G. C. Righine, V. Russo, S. Scottini, G. Toraldo di Francia, "Thin Geodesic Lens", Applied Optics, Vol. 11, page 1442, 1972).

The optical properties of such a type of lens (called geodesic lens) exclusively depend upon the geometrical characteristics of the surface. Therefore, the optical system of the device object of the invention operates in a perfectly equal manner, for whatever propagation mode of the wave guide. This feature represents a certain advantage with respect to systems utilizing lenses presenting a variation of the effective refraction index of the same guide, as these lenses do not present this property. Moreover, the geodesic lenses utilized in the device present no spherical aberration, whereas the only aberration present, the coma, has negligible effect, in the practical use of the device.

The optical system according to the invention is closely related to the so-called "double diffraction" system, utilized in conventional optics, and therefore perfectly suited to be used as a miniaturized optical elaborator of unidimensional signals (A. Vander Lugt: "Coherent Optical Processing" Proceedings of IEEE, Vol. 62, page 1300, 1974).

The spherical lune 1 serves at the same time the support, which gives to the upper located wave guide the needed curvature and the common substratum of the whole integrated circuit, on which the remaining elementary components may be built. This means that, leaving aside the non-planar shape of the substrate, said device does not require any special technique or material for the production of the lenses (as the curvature of the thin film 2 causes the lens effect).

Figure 2:
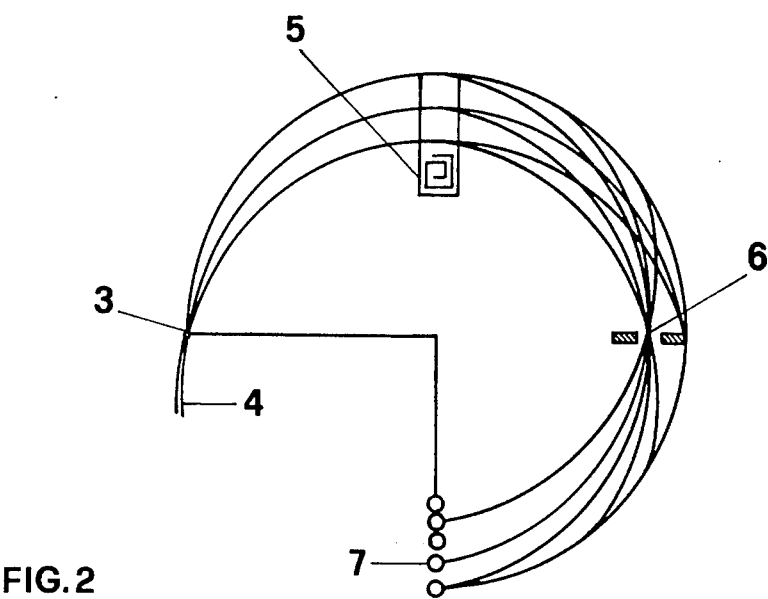
FIG. 2 is a lay-out of the various elements, and the way followed by the optical rays, when the processor is employed as a time-integrating optical correlator of unidimensional signals.

An advantageous embodiment of the device is given, as an example, in the project of a correlator with time-integration of unidimensional signals, represented in outline in FIG. 2. This correlator comprises a point source 3 of the signal, obtained with an optical fiber 4, and located on the meridian delimiting the thin film 2 (hereinafter indicated as meridian at 0° or entrance meridian). On the meridian at 90°, i.e. on the other meridian delimiting the spherical lune $L_1$, an integrated modulator 5 is located, for instance of the acoustic-optical type, directly built in the substrate 1, according to known techniques. On the meridian at 180° is located a space-filtering device, for instance a diaphragm 6, whereas on the meridian at 270° is located the whole of the detectors 7, directly built in the substrate 1 and formed from semiconductor material.

The correlator operates as follows:

The point source 3 issues a signal $s_1(t)$, the intensity of which is time-modulated.

The first spherical lune $L_1$ represents a lens, which performs the task of collimating of the beam issued by the source 3. On the meridian at 90°, the input signal $s_1(t)$ is modulated by a second signal $s_2(x+vt)$, introduced by the modulator 5. The diffracted light bundle coming out from the modulator 5 has become modulated due to the signal s, which is the product of the signals $s_1$ and $s_2$.

The second spherical lune $L_2$ operates a spatial Fourier's transform (G. C. Righini et al., "Thin Geodesic Lens") and thereafter, on the meridian at 180° it is easy to separate the diffracted (modulated) bundle from that non diffracted by the modulator 5, by means of the diaphragm 6.

Lastly, the third spherical lune $L_3$, operating a second space Fourier's transform, gives a perfect image of the signal, which is collected by detectors 7, located on the meridian at 270°. The collected signal is time-integrated; in fact, if T is the time constant of the detectors, the exit signal I(x) may be written as $$\int_0^T s_1(t)s_2(x+vt)dt,$$

which represents the required correlation function.

The described correlator offers certain advantages due to its simple construction and to its high processing capability, secured by the adoption of an integrated modulator, which presents by far better operational characteristics than similar traditional devices, with respect to the adsorbed power, the speed of operation and the band width.

In an advantageous embodiment, not shown in the drawings, the diaphragm 6 is replaced by a different passband filter, spaced variable, so as to allow the processing of a wider range of input and/or modulator signals.

From what has been said, it appears essential that the thin layer 2 develops over 270°. The same cannot be said about the substrate 1, which might be formed from a complete sphere. On the other hand, due to construction and assembly reasons, it is preferable to realize it in the above-described way.

Moreover, it is not required that the thin film 2 develops from one to the other pole; it is sufficient that it forms an equatorial band of convenient width. In this respect, it may be useful to point out that the width of the optical wave guide is bound to the field angle and to the width desired for the optical system, or, in other words, is bound to the spatial distribution of the optical frequencies of the signal to be processed.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An optical thin film device for the processor for unidimensional signals comprising, a thin film of dielectric material transparent to laser radiation and shaped as a spherical lune having an angle of 270°, said thin film supported by a spherical substrate formed of material having a refractive index less than that of the thin film, a point source located on either meridian delimiting said thin film, detecting means located on the other meridian delimiting the thin layer, a modulator located on the meridian lying at 90° with respect to the input meridian, and a device located on the meridian lying at 180° with respect to the input meridian for the spatial-filtering of a signal coming from the modulator lying on the meridian at 90°.

2. An optical thin film processor as defined in claim 1, wherein the spatial-filtering device is a filter having a spatial-distribution of the complex amplitude transmittance constant in the time.

3. An optical thin film processor as defined in claim 1, wherein the filter consists of a stop for the incident radiation, provided with at least an opening for the passage of the part of the signal containing the information to be detected.

4. An optical thin film processor as defined in claim 2, wherein the filter consists of a stop for the incident radiation, provided with at least an hole for the passage of the part of the signal containing the information to be detected.

5. An optical thin film processor as defined in claim 1, wherein the spatial-filtering device is a modulator of the signal coming from spatial modulator on said meridian at 90°.

6. An optical thin film processor as defined in claim 1, wherein the thin film consists of an equatorial band the numerical aperture of which depends upon the field angle and the width of the optical system.

7. An optical thin film processor as defined in claim 1, wherein the substrate consists of a spherical segment having an angle of 270°.

* * * * *